Dec. 31, 1935.  G. BROULHIET  2,025,721
FRONT AXLE PROVIDED WITH INDEPENDENT WHEELS
Filed Sept. 21, 1933   3 Sheets-Sheet 1
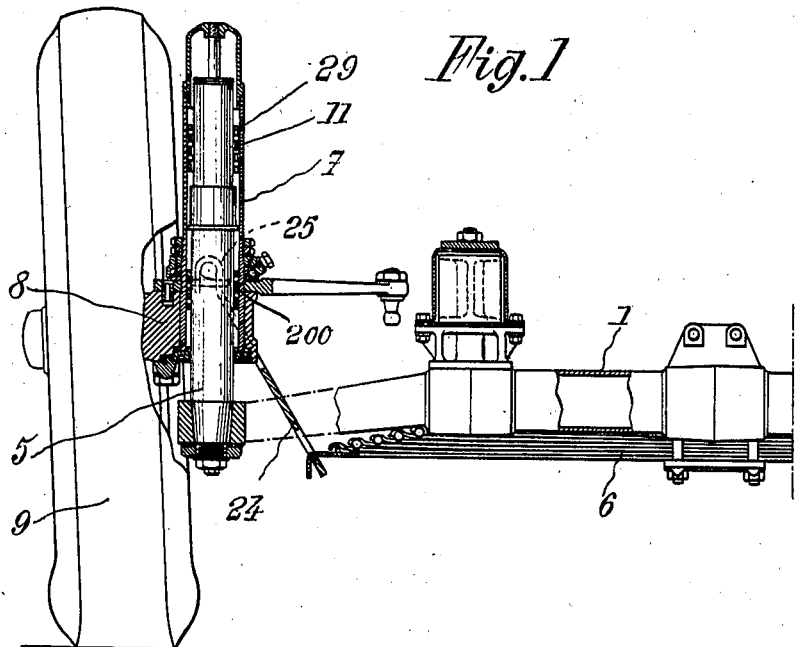
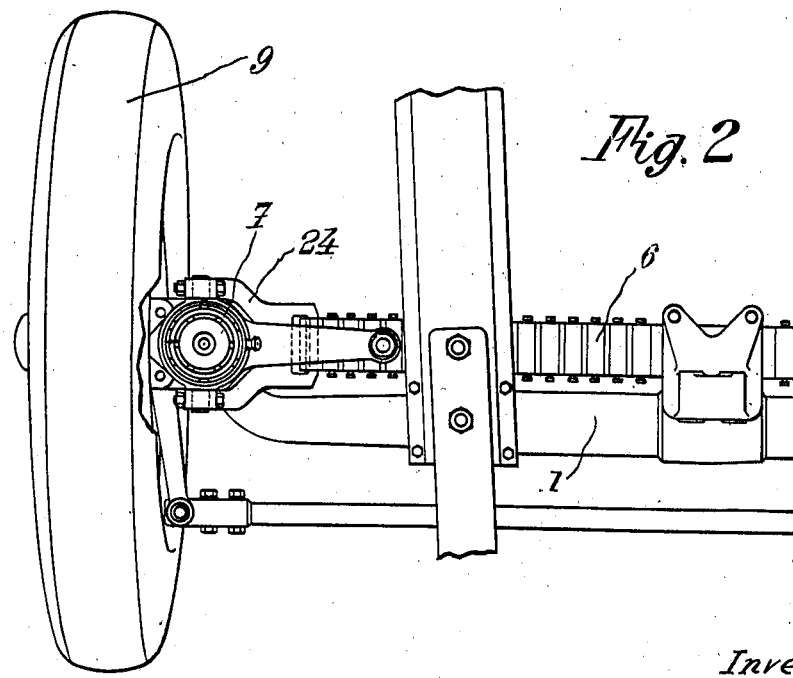
Inventor:
Georges Broulhiet
Attorneys:
Bailey & Larson Dec. 31, 1935.　　　G. BROULHIET　　　2,025,721
FRONT AXLE PROVIDED WITH INDEPENDENT WHEELS
Filed Sept. 21, 1933　　　3 Sheets-Sheet 2
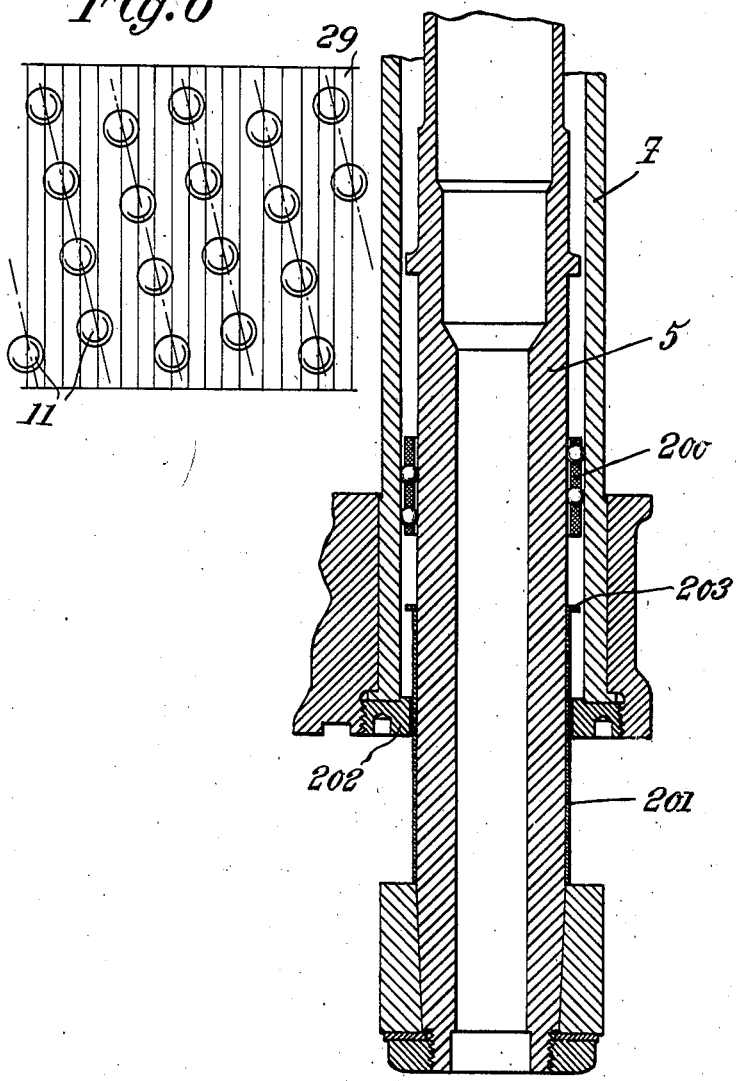
Inventor:
Georges Broulhiet
Attorneys:
Bailey & Larson

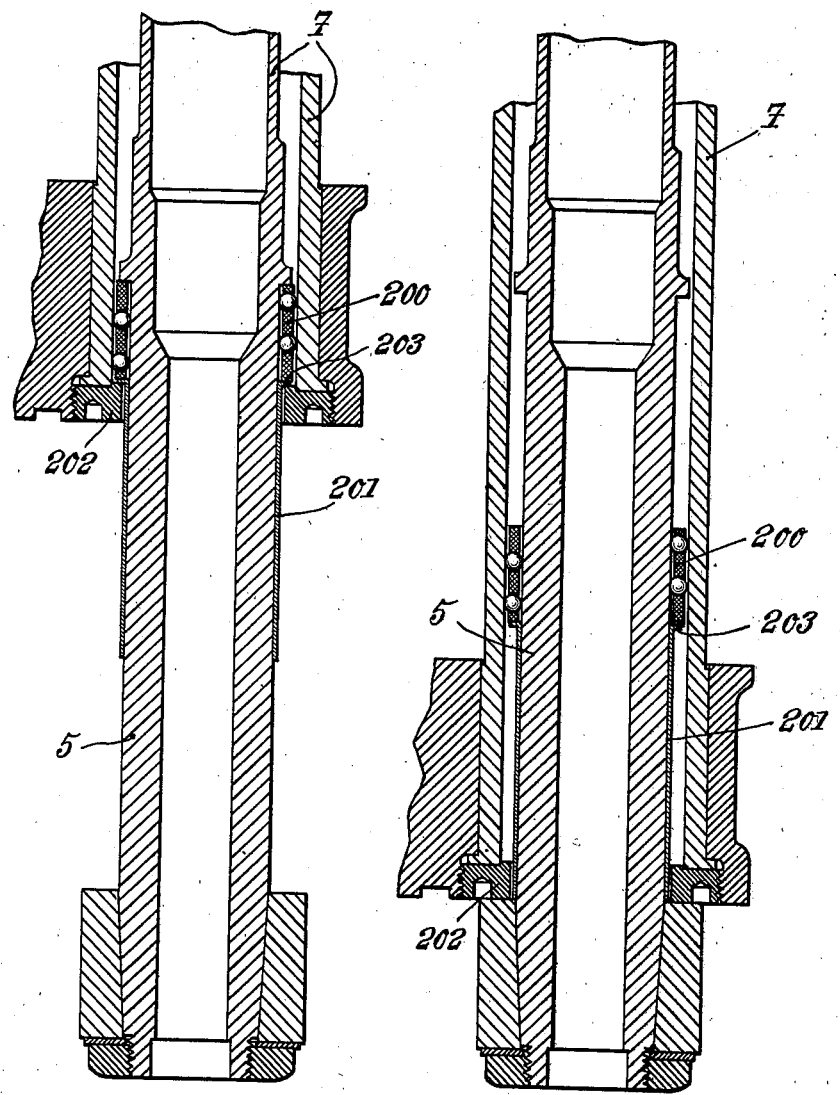

Patented Dec. 31, 1935

2,025,721

UNITED STATES PATENT OFFICE 2,025,721

FRONT AXLE PROVIDED WITH INDEPENDENT WHEELS

Georges Broulhiet, Paris, France

Application September 21, 1933, Serial No. 690,462
In France November 9, 1932

12 Claims. (Cl. 280—96.2)

The present invention relates to suspension devices for vehicles having independent front wheels, of the kind in which the stub axle or trunnion of each wheel is supported by an element adapted, on the one hand, to slide preferably in a vertical direction with respect to the frame against the action of elastic means, and, on the other hand, to pivot relatively to a second element supported by the vehicle frame.

This application is a continuation-in-part of my earlier application, Serial Number 628,916, filed August 15, 1932.

In a preferred embodiment of my invention, the front axle which consists of the front cross member of the frame is provided at each end with an upwardly extending extension on which a system comprising a sleeve, the wheel stub axle and the corresponding wheel, is adapted both to slide and to pivot.

The essential feature of the present invention lies in the fact that the spindle and the sleeve are not in guiding contact with each other, at least one ball bearing being interposed between said spindle and said sleeve so as to keep these two elements in coaxial relation with respect to each other. Preferably, there are two ball bearings, one of which is located at the upper part of the spindle and the other one at the lower part thereof.

Other features of the present invention will appear from the following detailed description thereof.

Preferred embodiments of the present invention will be hereinafter described with reference to the accompanying drawings, given merely by way of example, and in which:

Figs. 1 and 2 show, in elevation (partly in section), and in a plan view, respectively a front suspension device according to the invention.

Figs. 3 to 5 show, in section, respectively in three different operative positions, certain elements of said suspension.

Fig. 6 is a detail view showing the arrangement of the balls in the ball bearings.

In the embodiment of the present invention shown in Figs. 1 and 2, the front axle 1 of the vehicle is rigidly fixed to the vehicle and constitutes, for instance, the front cross member thereof.

Each end of the front axle carries a spindle 5 rigid with said axle and mounted in a substantially vertical position.

Upon each spindle 5 there is engaged a sleeve 7 which is a part of a wheel carrying member including the stub axle 8 of the wheel 9.

In order to connect wheel 9 with the frame of the vehicle, I provide an elastic system which preferably includes, (as shown in Figs. 1 and 2) a transverse leaf spring 6 the middle part of which is fixed to the front axle 1 and each end of which is connected through a link 24 with an annular member 25 journalled about sleeve 7.

Preferably, these links 24 are disposed obliquely in order to compensate, at least in part, for the reaction stresses that might be transmitted by the lower end of sleeve 7 to said spindle 5.

Finally, shock absorbing devices, for instance hydraulic shock absorbers, are interposed between the corresponding ends of sleeve 7 and spindle 5.

In suspension devices of this kind that are known at the present time, spindle 5 is guided in sleeve 7 by a smooth bearing provided at the lower end of said sleeve 7. At the upper end, a ball bearing, consisting of balls 11 mounted in a ball cage 29, serves to maintain the spindle and the sleeve in coaxial relation with each other.

On the contrary, in the device according to the present invention, there is no direct guiding contact between spindle 5 and sleeve 7. Of course, in this suspension device, an embodiment of which is illustrated by Figs. 1 and 2, there is still provided, at the upper part of the sleeve, a ball bearing 11—29, as above explained, but the smooth bearing integral with sleeve 7 at the lower part thereof and adapted to guide spindle 5 is replaced by a second ball bearing 200 similar to ball bearing 29.

It is to be understood that these two ball bearings 29 and 200 could be replaced by a single ball bearing of sufficient length. It would also be possible to provide more than two ball bearings.

For example, it would be possible to constitute the said ball bearings by a single tubular element provided with holes adapted to contain balls of a diameter superior to the thickness of said element, each of said balls being at the same time in contact with spindle 5 and with sleeve 7.

Whatever be the embodiment that is adopted, it is clear that any sliding friction between the elements 5 and 7 is avoided, whatever be the relative movements of said elements.

Under these conditions, it is not necessary to give links 24 the exact obliquity for which any transversal reaction against the lower bearing is eliminated.

Moreover it should be noted that the elimination of these transversal reactions could only be obtained when the vehicle was at rest. When the latter is running, the reactions exerted between the wheels and the road vary for instance under the influence of bumps, or when a braking action is exerted, or when the vehicle negotiates a curve; consequently, very important reactions may be created, even in the lower zone of contact between spindle 5 and sleeve 7.

When a smooth bearing is utilized, these transversal reactions create frictional stresses which reduce the sensitiveness of the suspension, and often to a different degree for the respective wheels.

With a device such as shown in Figs. 1 and 2, all the transversal reactions are transmitted by balls which roll without friction, so that the sensitiveness of the suspension remains nearly constant.

With a structure such as above described, it may however occur that, when the transversal reactions become equal to zero, the ball cage would drop under the mere action of its weight; in this case, when the wheel moves downward relatively to the frame, the ball cage would be stopped at the lower part of spindle 5, and a sliding friction between the balls and the corresponding surfaces of elements 5 and 7 would be created.

In order to avoid such a sliding movement, there are advantageously provided means for preventing the lower ball cage from moving downwardly, or, more precisely, means for permitting said cage to be always brought back to a correct position every time the wheel moves upwardly with respect to the frame, with a sufficient amplitude.

To this end, said means preferably consist of an intermediate member such as a cylindrical tube 201 (Figs. 3 to 5) interposed between spindle 5 and the inner edge of plug 202 disposed at the lower part of sleeve 7, this tube being capable of sliding freely between elements 5 and 202, but preferably with a fluid tight fit.

The length of said tube is so determined that, when the wheel is in its highest position and tube 201 rests at its lower end upon an abutment constituted for example by the end of axle 1, this tube prevents the ball cage 200 from moving down below the theoretical position it should assume for this highest position of the wheel (Fig. 5).

It is to be understood that said tube may be either carried upon the ball-cage, or independent thereof.

In this latter case, tube 201 will slide freely on spindle 5 and, when the wheel reaches its lowest position (Fig. 4), a flange 203 provided on tube 201 will be pushed down by the lower edge of the cage 200, until said flange will come into contact with an abutment constituted for example by the plug 202.

Besides the already mentioned advantages, said tube 202 will, to a certain extent, protect spindle 5 against dust and other matters projected from the road.

Concerning the ball bearings, balls 11 might be disposed in cage 29 so as to form a plurality of staggered rows. But in this case all the balls that are disposed along the same generatrix of the cylinder would, when rolling under the action of a sliding displacement of spindle 5 in sleeve 7, follow the same track. The local wear of these pieces would then be multiplied by the number of balls disposed on a given generatrix.

In the arrangement of Fig. 6, the balls are disposed along parallel helicoidal lines in such a manner that there may be only one ball on each generatrix of the cylinder, thus reducing to a minimum the wear of sleeve 7 and spindle 5. It is also possible, in order further to reduce this wear, to dispose the rolling surfaces of said sleeve and said spindle on auxiliary sleeves fitted in the latter, these sleeves consisting for instance of a sheet of a hard metal rolled in a suitable manner with its edges joined along a generatrix of the cylinder or obliquely.

While I have illustrated and described the preferred form of construction for carrying my invention into effect, this is capable of variation and modification without departing from the spirit of the invention. I therefore do not wish to be limited to the precise details of construction set forth, but desire to avail myself of such variations and modifications as come within the scope of the appended claims.

What I claim and desire to secure by Letters Patent of the United States is:

1. In a vehicle including a frame and a front axle carried by said frame, a suspension device which comprises in combination, a substantially vertical guiding spindle rigid with each end of said axle, a wheel carrying member including a sleeve surrounding said spindle without guiding contact therewith and a wheel stub axle extending outwardly from the lower portion of said wheel carrying member, at least one ball bearing unit movable freely throughout the relative movement of said spindle and sleeve interposed between said spindle and said sleeve so as to keep these two last mentioned elements in coaxial relation with each other, and means for interconnecting said frame and said sleeve.

2. In a vehicle including a frame and a front axle carried by said frame, a suspension device which comprises in combination, a substantially vertical rigid spindle carried by each end of said axle, a wheel carrying member including a sleeve surrounding said spindle without guiding contact therewith and a wheel stub axle extending outwardly from the lower portion of said wheel carrying member, at least one ball bearing unit movable freely throughout the relative movement of said spindle and sleeve interposed between said spindle and said sleeve so as to keep these two last mentioned elements in coaxial relation with each other, a transverse spring carried by said axle, an annular member journalled about said sleeve, and a link pivoted at one end to said spring and at the other end to said member for interconnecting said frame with said sleeve.

3. In a vehicle including a frame and a front axle carried by said frame, a suspension device which comprises in combination, a substantially vertical guiding spindle rigid with each end of said axle, a wheel carrying member including a sleeve surrounding said spindle without guiding contact therewith and a wheel stub axle extending outwardly from said wheel carrying member at the lower part thereof, two ball bearing units movable freely throughout the relative movement of said spindle and sleeve interposed between said spindle and said sleeve, one at the upper part and the other at the lower part thereof, so as to keep these two last mentioned elements in coaxial relation with each other, and means for interconnecting said frame and said sleeve.

4. A suspension device according to claim 1 further comprising means for preventing said ball bearing from dropping to the bottom of the annular space between said spindle and said sleeve under the action of its own weight.

5. A suspension device according to claim 1 further comprising a tubular member surrounding said spindle and provided with a flange for preventing said ball bearing from dropping to the bottom of the annular space between said spindle and said sleeve under the mere action of its own weight.

6. In a vehicle including a frame and a front axle carried by said frame, a suspension device which comprises, in combination, a substantially vertical guiding spindle rigid with each end of said axle, a wheel carrying member including a sleeve surrounding said spindle without guiding contact therewith and a wheel stub axle extending outwardly from the lower portion of said wheel carrying member, at least one ball bearing interposed between said spindle and said sleeve so as to keep these two last mentioned elements in coaxial relation with each other, and means for interconnecting said frame and said sleeve, the balls of the ball bearing being so arranged that there is never more than one ball in contact with a generatrix of either of the two elements, spindle and sleeve, between which said bearing is inserted.

7. In a vehicle including a frame and a front axle carried by said frame, a suspension device which comprises, in combination, a substantially vertical guiding spindle rigid with each end of said axle, a wheel carrying member including a sleeve surrounding said spindle without guiding contact therewith and a wheel stub axle extending outwardly from the lower portion of said wheel carrying member, at least one ball bearing interposed between said spindle and said sleeve so as to keep these two last mentioned elements in coaxial relation with each other, and means for interconnecting said frame and said sleeve, the balls of the ball bearing being disposed along parallel helicoidal lines so that there is never more than one ball in contact with a generatrix of either of the two elements, spindle and sleeve, between which said bearing is inserted.

8. In a vehicle including a frame and a front axle carried by said frame, a suspension device which comprises, in combination, a substantially vertical guiding spindle rigid with each end of said axle, a wheel carrying member including a sleeve surrounding said spindle without guiding contact therewith and a wheel stub axle extending outwardly from the lower portion of said wheel carrying member, said sleeve and spindle forming therebetween an annular space of a length at least half as great as the relative movement between the sleeve and spindle, at least one ball bearing unit within said space movable freely throughout the relative movement of said spindle and sleeve interposed between said spindle and said sleeve so as to keep these two last mentioned elements in coaxial relation with each other, whereby said ball bearing unit may move with respect to both said sleeve and spindle in rolling contact therewith throughout any relative movement of the sleeve and spindle, and means for interconnecting said frame and said sleeve.

9. In a device as claimed in claim 1, said sleeve being rotatable with respect to said spindle, the surface of contact of the spindle and sleeve with the ball bearing unit being smooth and cylindrical, whereby said ball bearing may move in rolling contact with both the sleeve and the spindle during relative rotary movement therebetween.

10. A telescopic suspension for the front wheels of motor vehicles, comprising a frame, a vertical guiding support connected to said frame, a wheel carrying member mounted in telescopic relation to said support, at least one ball bearing unit interposed between said support and said wheel carrying member, the balls of said unit being in contact on one side with said support and on the other with said wheel carrying member, said ball bearing unit being movable freely throughout the relative movement of said wheel carrying member and support, so that the unit moves at half the speed of the relative movement between the support and the wheel carrying member, and an elastic connection between the wheel carrying member and the frame for supporting the frame.

11. A telescopic suspension for the front wheels of motor vehicles, comprising a frame, a vertical guiding support connected to said frame, a wheel carrying member mounted in telescopic relation to said support and rotatable with respect thereto, at least one ball bearing unit interposed between said support and said wheel carrying member, the balls of said unit being in contact on one side with said support and on the other with said wheel carrying member, said ball bearing unit being movable freely throughout the relative movement of said wheel carrying member and support, so that the unit moves at half the speed of the relative movement between the support and the wheel carrying member, and an elastic connection between the wheel carrying member and the frame for supporting the frame.

12. A front axle assembly for motor vehicles having steering wheels with independent movements, comprising a chassis, an axle fixed to the chassis, an upward extension on each end of said axle, a wheel assembly comprising a sleeve slidably and rotatably mouted upon said upward extension and a wheel carried by said sleeve, a cage arranged between said extension and sleeve, floating balls mounted in said cage, said balls projecting beyond each side of the cage and being in contact with the sleeve and the extension, said cage being movable freely throughout the relative movement of the extension and sleeve, whereby the cage moves at half the speed of the relative movements of the sleeve and the extension, and elastic means connecting said sleeve to said chassis.

GEORGES BROULHIET.